US008027511B2

(12) United States Patent
Philip et al.

(10) Patent No.: US 8,027,511 B2
(45) Date of Patent: Sep. 27, 2011

(54) SYSTEM FOR VIRTUALLY DISTRIBUTING MAILPIECES

(75) Inventors: Olivier Philip, Noves (FR); Ruben Rico, Paris (FR)

(73) Assignee: Neopost Technologies, Bagneux (FR)

( * ) Notice: Subject to any disclaimer, the term of this patent is extended or adjusted under 35 U.S.C. 154(b) by 771 days.

(21) Appl. No.: 12/135,357

(22) Filed: Jun. 9, 2008

(65) Prior Publication Data

US 2008/0304704 A1 Dec. 11, 2008

(30) Foreign Application Priority Data

Jun. 8, 2007 (FR) ..................................... 07 55622

(51) Int. Cl.
*G06K 9/00* (2006.01)
*G06F 17/00* (2006.01)

(52) U.S. Cl. ......................... 382/101; 209/584; 705/401

(58) Field of Classification Search .................. 382/100, 382/101; 209/509, 584, 606, 900; 700/90; 705/60, 64, 401, 402, 406, 407; 715/205, 715/210, 256

See application file for complete search history.

(56) References Cited

U.S. PATENT DOCUMENTS

| | | | | |
|---|---|---|---|---|
| 5,648,916 | A * | 7/1997 | Manduley | 700/90 |
| 7,301,115 | B2 * | 11/2007 | Elliot et al. | 209/584 |
| 2001/0012378 | A1 | 8/2001 | Kanevsky et al. | |
| 2003/0004893 | A1 | 1/2003 | Blaesche | |

FOREIGN PATENT DOCUMENTS

NL 1023454 C2 11/2004

* cited by examiner

*Primary Examiner* — Abolfazl Tabatabai

(74) *Attorney, Agent, or Firm* — Sughrue Mion, PLLC

(57) ABSTRACT

A method of enabling mailpieces to be distributed and consulted in electronic form, including the steps of scanning each of the mailpieces and transmitting the images of the mailpieces to a first server; displaying the images on a first viewing screen associated with the first server, and assigning each of the images to a recipient by "dropping" the image into one of the pigeonholes of a virtual sorting rack associated with the recipient and displayed on the first viewing screen or on a second viewing screen also associated with the first server; and displaying a dynamic dialogue box on at least one consultation screen of a final recipient.

11 Claims, 4 Drawing Sheets

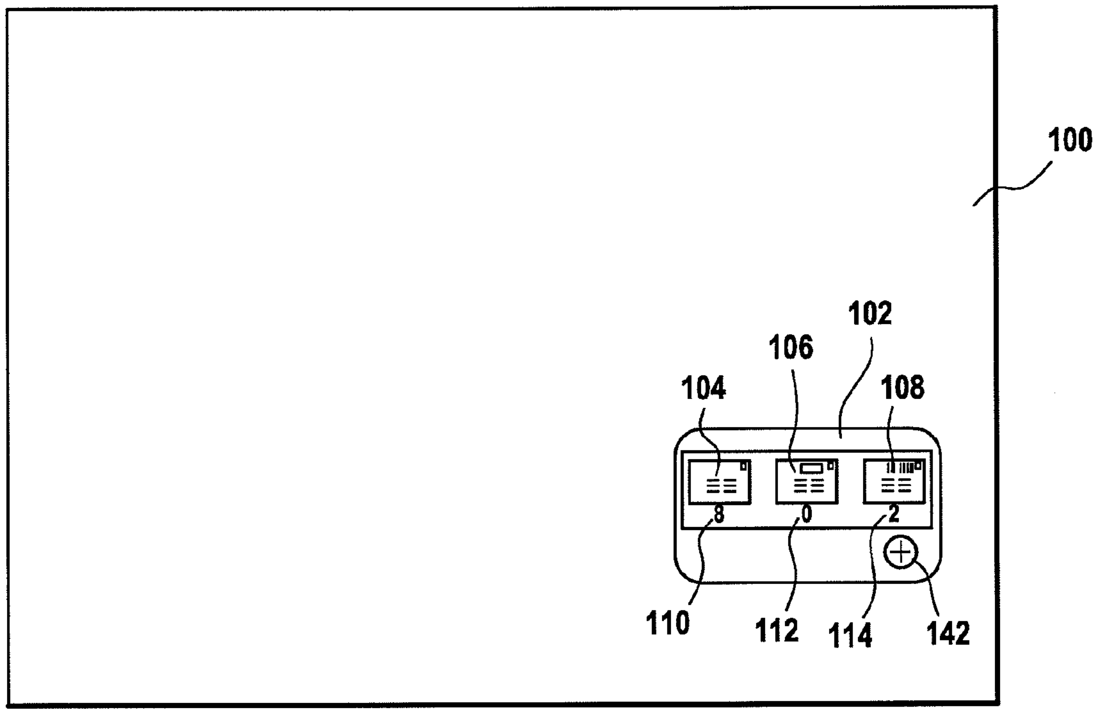
FIG.5
FIG.6
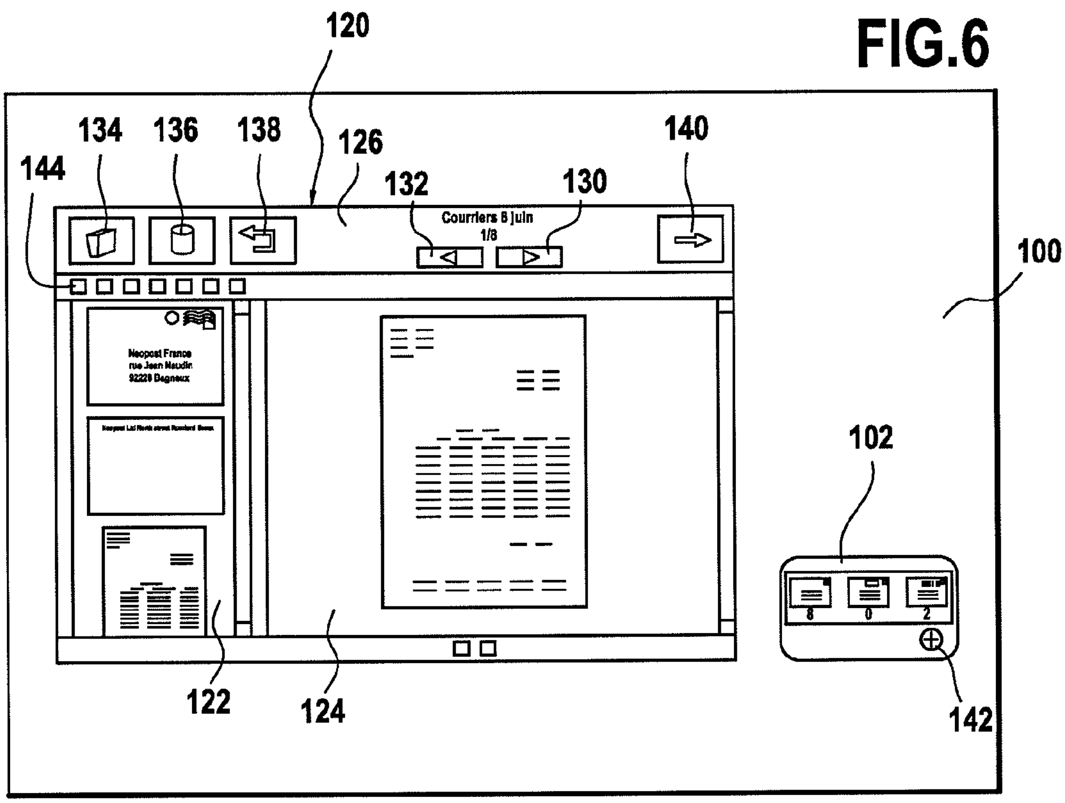

SYSTEM FOR VIRTUALLY DISTRIBUTING MAILPIECES

TECHNICAL FIELD

The present invention relates exclusively to the field of mail handling, and it relates more particularly to a system for distributing and for consulting mailpieces, which system makes it possible for mailpieces that are received in mail departments of businesses to be distributed and consulted in electronic form.

PRIOR ART

Currently, mail sorting in commercial or industrial businesses is a process that is essentially manual. The operator of the mail department who is assigned to that task takes the mailpieces one-by-one, identifies the indication of the recipient person or of the recipient department, and, in general after opening the mailpiece, drops the document(s) contained in the mailpiece into the pigeonhole corresponding to that person or to that department. Clearly, such a fully manual process takes varying amounts of time, and suffers from having productivity that is inversely proportional to the number of pigeonholes, to the frequency with which the members of staff or the departments change, or to the irregularity with which the operator of the mail department performs the task (e.g. the operator might be replaced by a trainee while on leave). Furthermore, it is commonly observed that the distribution of mail inside a business, from the time at which it is received by the mail department to the time at which it is handed over to its final recipient for consultation, takes at best several hours, and usually takes one or even two days in businesses having several sites with a common postal address.

Endeavors have thus been made to reduce the lengths of such distribution times (with a corresponding increase in productivity) by proposing various types of device making it possible to automate the manual processes to some extent. In particular, with its European Patent Application EP 1 066 885, the Applicant has proposed an improved sorting device that implements optical character recognition (OCR) and speech recognition means making it possible to inform by telephone or by email the recipient of a mailpiece received in the mail room. Although that device is generally satisfactory, it suffers from certain drawbacks. Firstly, the software must be able to recognize both printed typewriting and also handwriting, which requires the OCR means to be highly technical. In addition, the fact that a correspondence table is used requires that table to be constantly updated so as to guarantee that the mailpieces are sorted correctly. Otherwise, a high percentage of mailpieces are not recognized and must be sorted manually. Finally, even if the recipient is contacted by telephone, said recipient is merely informed of the end of the sorting process or of the arrival of a mailpiece, without the recipient being able to find out the contents of the mailpiece and thus to assess the utility of receiving it physically.

OBJECTS AND DEFINITION OF THE INVENTION

An object of the present invention is thus to remedy those drawbacks by informing the recipient in real time about the mailpieces that are addressed to said recipient. Another object of the invention is to enable the recipient to decide what to do with said mailpieces, in such a manner as to optimize the mail distribution cycle by avoiding, in particular, obliging the recipient to receive mailpieces that are unnecessary or that it is preferable to archive. A further object of the invention is to propose a system that guarantees very simple implementation using current scanning tools that are increasingly common in the mail rooms of businesses, but without using complex recognition software.

These objects are achieved by a method of enabling mailpieces to be distributed and consulted in electronic form, said method comprising the following steps:

- scanning each of the mailpieces and transmitting the images of the mailpieces scanned in this way to a first server on which said images are stored;
- displaying said images stored on said first server on a first viewing screen associated with said first server, and assigning each of said images to a recipient by "dropping" said image into one of the pigeonholes of a virtual sorting rack associated with said recipient and displayed on said first viewing screen or on a second viewing screen also associated with said first server; and
- displaying a dynamic dialogue box on at least one consultation screen of a final recipient, said dynamic dialogue box including at least one counter whose value depends on the number of images that are assigned to the pigeonhole of said final recipient and that are accessible on said first server from said consultation screen via a local area network connecting said consultation screen to said first server.

By means of this particular method, the recipients of scanned mailpieces are informed immediately of the arrival of mail addressed to them by a change in the values of the counters of the dynamic dialogue boxes displayed on their consultation screens.

This method may further comprise a step of displaying images assigned to one of said pigeonholes on at least one other viewing screen associated with a computer workstation connected to said first server via said local area network, and of assigning each of said images to its final recipient by "dropping" said image into one of the pigeonholes of another virtual sorting rack associated with said final recipient and displayed on said other viewing screen. It may further comprise a step of labeling each of the mailpieces, which step consists in associating the mailpiece as viewed on said viewing screen with a determined type of mail chosen from among the following types: express mail, tracked mail, and registered mail.

Advantageously, it further comprises a step of remotely displaying a dynamic dialogue box on a remote consultation screen of a remote recipient connected to said local area network via an external communications network, said dynamic dialogue box including at least one counter whose value depends on the number of images that are assigned to the pigeonhole of said remote recipient and that are accessible on said first server from said remote consultation screen via both said external communications network and said local area network connecting said remote consultation screen to said first server.

Regardless of whether said consultation screen is local or remote, said images that are accessible on said first server via said consultation screen are backed up locally, destroyed, archived, or forwarded to another recipient, as selected by the recipient.

Preferably, provision is made for a step of archiving said scanned images on a second server connected to said local area network via said external communications network.

The invention also provides a system for enabling mailpieces to be distributed and consulted in electronic form, said system implementing the above-mentioned method, and in which system, in particular, said external communications network is the Internet, and the link between said at least one remote consultation screen and said first server is a secure link.

BRIEF DESCRIPTION OF THE DRAWINGS

Other characteristics and advantages of the present invention appear from the following description, given by way of non-limiting example, and with reference to the accompanying drawings, in which:

FIGS. 5 and 6 show an example of images displayed on a consultation screen of a final recipient before and during consultation of one of the scanned mailpieces of which said final recipient is the recipient.

DETAILED DESCRIPTION OF A PREFERRED IMPLEMENTATION

Figure 1:
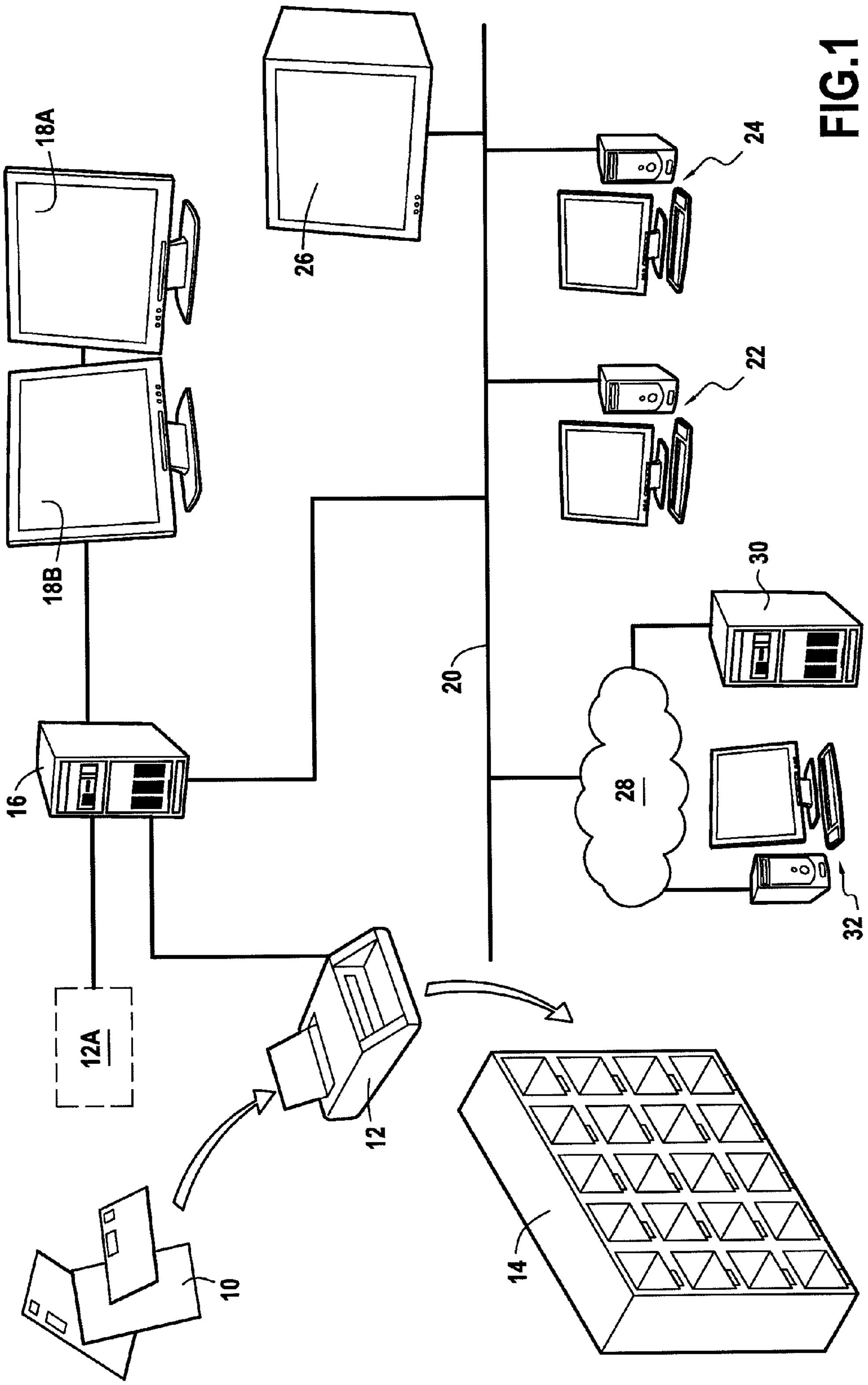
FIG. 1 shows a system of the invention for enabling mailpieces to be distributed and consulted in electronic form.

The present invention aims to optimize the mail distribution cycle in a business by reducing the lengths of time required for recipients to be informed about their mail, regardless of whether or not they are present on the premises of the business, while limiting the risks of the mail being lost, and while enabling the mail to be tracked better. The present invention is implemented in addition to the usual equipment in the mail room, in particular in addition to the scanning tools that currently exist in most business mail departments, and it uses mail distribution and consultation software specially developed to operate in a client/server architecture. An example of a system of the invention is thus shown in FIG. 1.

In this system for distributing and consulting mailpieces, after an operator of the mail room has taken mailpieces 10 from a mailbag, has date/time-stamped them one-by-one, and, if necessary has pre-sorted them, in particular for extracting the confidential mailpieces from them, said operator opens the envelopes, and successively inserts said envelopes and the documents that they contain into a scanner 12 that has an optical reader and that is advantageously of the type enabling A4-format two-sided color scanning to be performed.

Once scanned, said mailpieces are physically dropped, depending on their recipients, into the various pigeonholes of a sorting rack 14 of the mail room for the purpose of being subsequently distributed to their recipients, i.e. later the same day or on the next day or on a later day.

In said mail room, the scanner is connected to an internal distribution server 16 to which two touch-sensitive screens 18A, 18B are connected, one of which screens serves to display a first graphics interface representing an image of the sorting rack 14 and thus comprising a predetermined number of pigeonholes corresponding to the number of real pigeonholes, and the other of which screens serves to display a second graphics interface successively representing the images of the envelopes and documents of each of the scanned mailpieces. In order to enable images of the mailpieces scanned in this way to be stored, at least temporarily, on said internal distribution server, each of said images being in the form of an image file of any one of the following types: Portable Document Format (PDF), Joint Photographic Experts Group (JPEG), Tagged Image File Format (TIFF), etc., the scanner must preferably make it possible for said image files to be transferred automatically to said internal server using a File Transfer Protocol (FTP) or some other equivalent protocol. Naturally, when the number of mailpieces to be handled is large ("large" being conventionally considered as being greater than 1000 pages per day), and when it is then desirable to reduce the overall length of time required for handling them, said internal distribution server can be connected in parallel to a plurality of analogous scanners such as the scanner referenced 12A. An example of such a scanner tool is given by the American Company Kodak's Scan Station 100 scanner. It should be noted that, in order to track the scanned mailpieces, and, if necessary, in order to archive them subsequently in an internal archive server or in an external server, a unique identification number should be assigned to each image file transmitted to the distribution server.

This internal server is connected via an in-house local area network 20 to various individual computer workstations of the staff of the business, each of which workstations incorporates a client for consulting the internal server, e.g. the workstation referenced 22 and 24, some of which computer workstations, e.g. the workstation referenced 26, being advantageously disposed in respective ones of the secretarial sections of the departments or divisions of the business, so as to act as relay stations between the internal distribution server 16 and the other computer workstations 22, 24, each of such workstations having, for that purpose, a touch-sensitive screen provided with a graphics interface associating, on the same screen, the above-mentioned first and second graphics interfaces. Advantageously, each such workstation is in the form of an "all-in-one" personal computer, as shown. The internal server is also advantageously connected via an external communications network, e.g. the Internet 28, to an external server 30 of a dealer of the mail distribution and consultation software implemented in the internal distribution software 16. Remote computer workstations 32 including a Web client for consulting the internal and external servers so as to be connected to said servers via the Internet are also provided in order to enable staff of the business who are working off-site to access their mail in spite of being outside the business.

Figure 2:
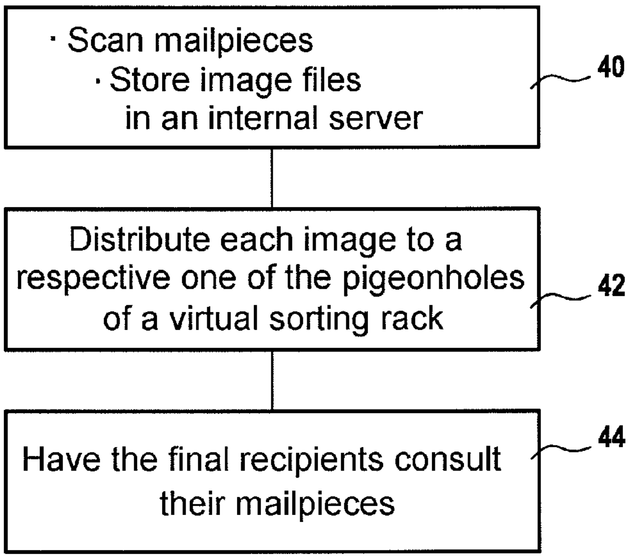
FIG. 2 is a flow chart of the various steps implemented in the system of the invention.

Operation of the system of the invention is particularly simple and is based essentially on three steps shown in FIG. 2, namely a first step 40 consisting in scanning each of the mailpieces and in transmitting each of them in the form of an image file to the internal server for storage and use, a second step 42 consisting in distributing/assigning said images, which step is performed by an operator of the mail room and optionally also by an intermediate recipient, by "dropping" the images into the pigeonholes of a virtual sorting rack, and a final step 44 consisting in the final recipient consulting the images of the mailpieces that concern said final recipient.

Figure 3:
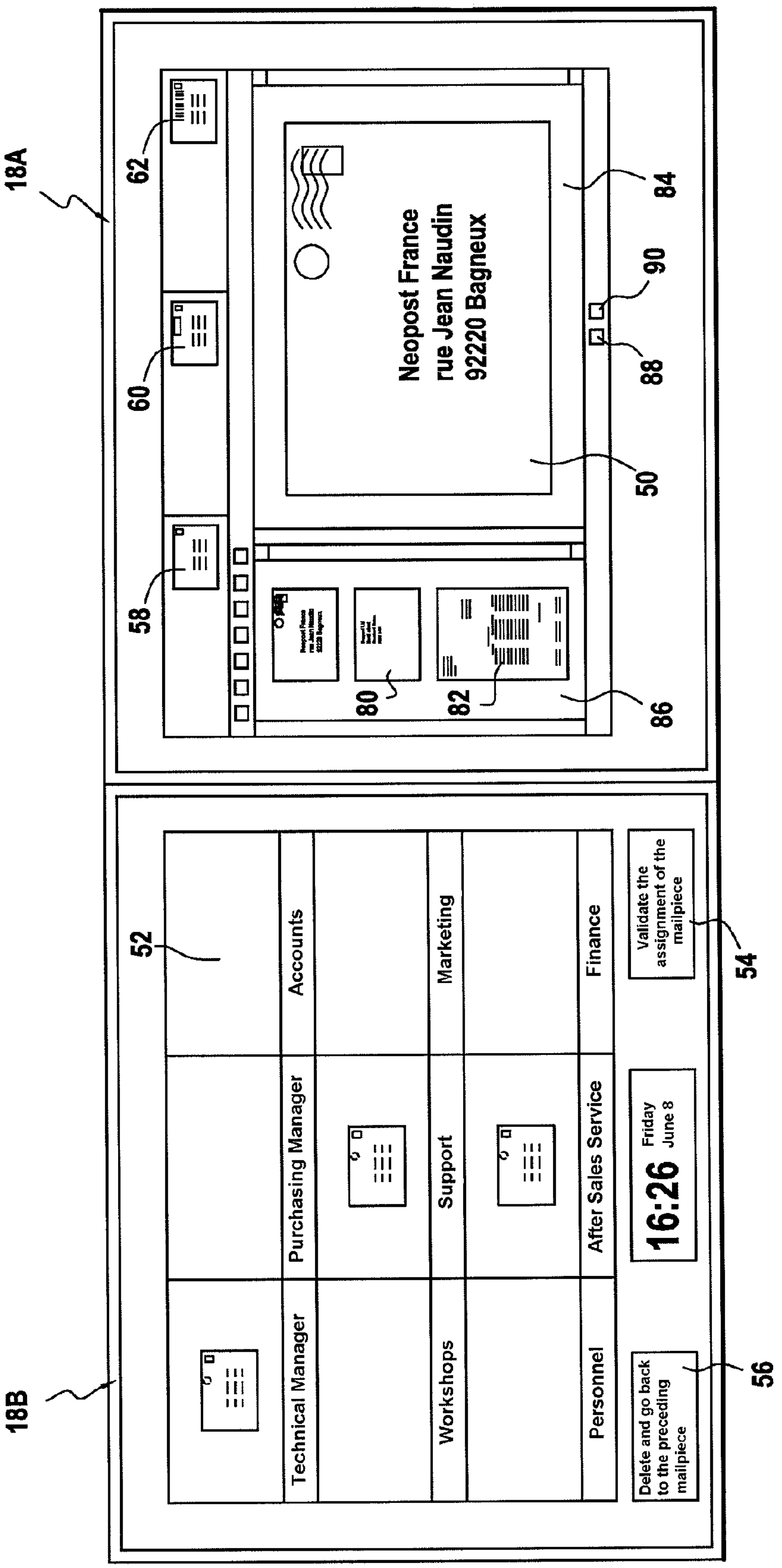
FIG. 3 shows an example of two graphics interfaces displayed on two viewing screens in the mail room.

As shown in FIG. 3, the images are preferably distributed by means of two touch-sensitive screens 18A, 18B (but a configuration with a single wide screen is also possible) by an operation consisting in selecting (clicking on) an image appearing on the first screen 18A and making it possible to identify the recipient, e.g. the image of an envelope 50, and then in selecting on the second screen 18B one of the pigeonholes 52 of the virtual sorting rack into which pigeonhole said envelope and its contents should be "dropped", and finally in validating that choice by "clicking" on an assignment confirmation button 54 present, for example, at the bottom of said second screen, this validation also, as described in more detail below, causing the recipient to whom the pigeonhole is assigned to be notified automatically. Thus, via the two graphics interfaces of the two viewing screens, virtual mail distribution is performed that is the reflection of the physical mail distribution that takes place in the mail room. It should be noted that it is possible to assign the mail to a plurality of recipients by selecting a plurality of pigeonholes before validating by pressing on the assignment confirmation button 54. It should also be noted that, in the event of error, it is possible to delete the assignments made (remove from the pigeonhole(s) the most recent mailpieces prior to the preceding validation) and to go back to the preceding mailpiece by pressing on a delete button 56 also disposed at the bottom of the screen.

During the selection of the mailpiece, the operator advantageously labels that mailpiece, i.e. classifies it from among a plurality of types of mail, such as, without the following list being limiting: express mail, tracked mail, or registered mail, for example. This classification is made by selecting, by clicking on it, one of the three icons 58, 60, 62 associated with the three types of mail and present, for example, at the top of the first screen.

Figure 4:
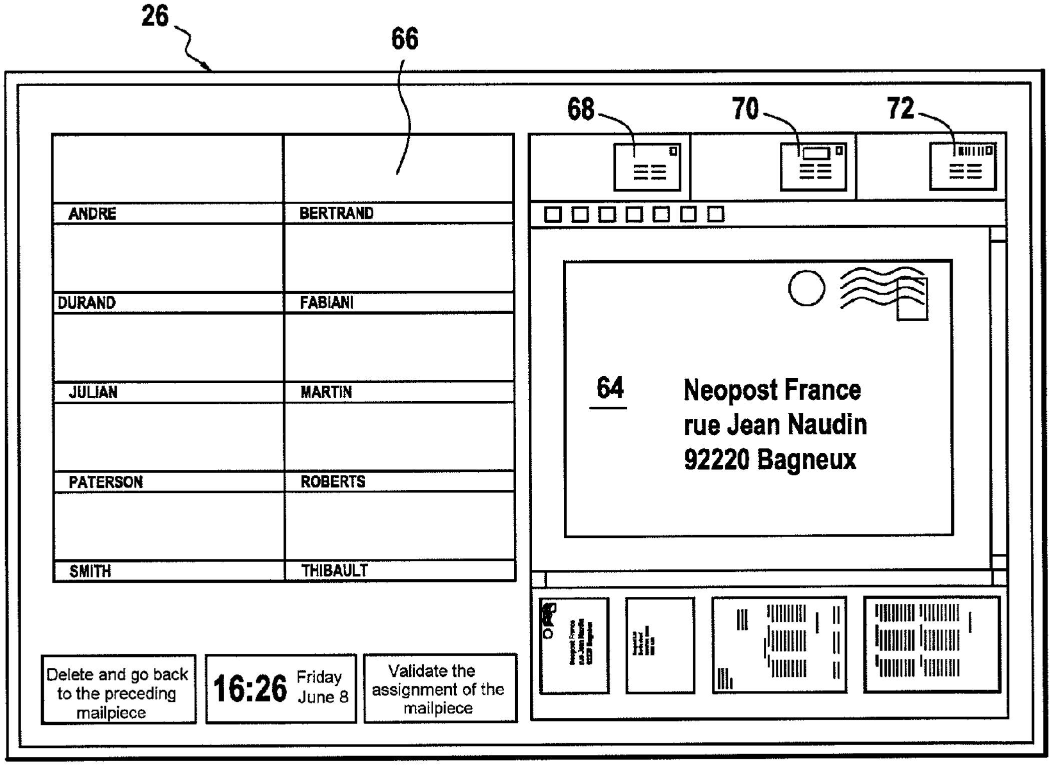
FIG. 4 shows an example of a graphics interface that is displayed on a viewing screen of an intermediate recipient.

When the recipient is not the final recipient of the mailpiece, but rather, for example, is a department or division of the business, that intermediate recipient, whose computer workstation 26 is then advantageously provided with a touch-sensitive viewing screen is, in turn, assigned to the task of virtually distributing the mailpieces that exclusively concern the department or division, this task preferably, as shown in FIG. 4, being performed by a simple "drag and drop" operation consisting, on the intermediate recipient's single graphics interface, in selecting an image of a mailpiece 64 and in moving it from its original location to another location corresponding to the pigeonhole 66 of the recipient, so as thus to assign to each member of staff of the department or division those mailpieces that are addressed to that member of staff by name. The intermediate recipient does not have to re-classify by type the mailpieces that are addressed to the department or division, except when the mail has not been labeled by the operator of the mail room, in which case the intermediate recipient can perform that labeling by means of the icons 68, 70, 72.

Naturally, only those people who are authorized, after supplying a log-in and a password (requested in a step prior to distribution) can perform such distribution and classification of the mailpieces and access the virtual sorting rack appearing on the second screen (FIG. 3) or on a second portion of the single screen which is then shared into two zones (FIG. 4), these screen naturally having been configured and filled-in during a prior initialization step, i.e. having been provided with a number of virtual pigeonholes that corresponds to the number of pigeonholes of the real piece of furniture in the mail room, or to the number of final recipients of a given department or division (when an intermediate recipient who is responsible for that department or division sorts the mail).

Returning to FIG. 3, it should be noted that, in order to facilitate distribution of the mail, the graphics interface of the touch-sensitive screen 18A giving access to the mail to be distributed is shared essentially into two display zones, one of which displays, in a small format in the form of thumbnails, the various images 80, 82 forming a determined mailpiece, and the other of which displays, in a format more directly readable by the operator, one of said images (50) that has been selected by the operator. On the side of each of said display zones, control zones are disposed with devices 84, 86 known as "scroll bars" or "scroll elevators" and making it possible to scroll rapidly through the images or thumbnails constituting each of the display zones and with, at the bottom of the screen, image change buttons 88, 90 making it possible, as is known, to go from one image to the other directly, or to go directly to the last image.

The final recipient consults mail on a consultation screen that is optionally remote from the recipient's own workstation 22, 24, 32. On the screen background 100 of the screen (FIG. 5) a dynamic dialogue box 102 appears that is updated continually by periodically and automatically connecting to the distribution server 16 on which the number of images is captured. In the example shown, the dynamic dialogue box has three icons 104, 106, 108 with which three individual counters 110, 112, 114 are associated, each of which corresponds to one of the above-mentioned three types of mail and whose value thus changes as a function of the mailpieces dropped in its virtual pigeonhole. By "clicking" on the icon in question, the recipient causes a consultation window 120 to appear (FIG. 6) in which said recipient can then, in a secure mode, become acquainted with all of their waiting mailpieces. It should be noted that, advantageously, in order to accelerate access, the images are not transmitted to the recipient, but rather said recipient receives merely a link for accessing said images on the internal server or, preferably, on the computer workstation 26 of a secretarial section to which the internal server has advantageously already sent a copy. This access is possible both for an employee inside the business, via the internal local area network 20, and also for an employee outside the business, via the Internet 28.

As shown, this consultation window can present a plurality of display zones, one such zone 122 being for viewing a succession of thumbnails of the various images forming a determined mailpiece, another such zone 124 being for viewing one of these images selected by the final recipient, e.g. an invoice as shown, and a last one of such zones 126 being a control zone on which the various possibilities appear for action by the final recipient on the mailpiece, it naturally thus being possible for said final recipient to become acquainted with mailpieces one-by-one by "clicking" on "next" and "back" scroll buttons 130, 132, but said final recipient can also destroy the consulted mailpiece, archive it on the external server 30 (or on any other internal server having an archiving function) or send it to another recipient by "clicking" respectively on the buttons 134, 136, 138, or indeed merely save a backup copy on a computer workstation by acting on the local save icon 144. The consultation is ended by acting on an exit button 140 which causes the status of the mailpieces to change (going from the "unread" status to the "read" status), and causes the corresponding counter to be decremented. It should be noted that the final recipient can, at any time, by acting on a +button 142 of the dynamic dialogue box 102, access an additional function for becoming re-acquainted with the mailpieces that have been consulted previously and that, since they have not been destroyed, are still present at the distribution server.

The invention is naturally not limited to the above-described implementations, and the person skilled in the art can, without showing any inventive step, imagine organizing the display or control zones of the consultation screens differently, in particular as a function of the operating system used, making provision for other types of mail to be classified, or adding additional functionality features.

What is claimed is:

1. A method of enabling mailpieces to be distributed and consulted in electronic form, said method comprising the following steps:

scanning each of the mailpieces and transmitting the images of the mailpieces scanned in this way to a first server on which said images are stored;

displaying said images stored on said first server on a first viewing screen associated with said first server, and assigning each of said images to a recipient by "dropping" said image into one of the pigeonholes of a virtual sorting rack associated with said recipient and displayed on said first viewing screen or on a second viewing screen also associated with said first server; and displaying a dynamic dialogue box on at least one consultation screen of a final recipient, said dynamic dialogue box including at least one counter whose value depends on the number of images that are assigned to the pigeonhole of said final recipient and that are accessible on said first server from said consultation screen via a local area network connecting said consultation screen to said first server.

2. A method according to claim 1, further comprising a step of displaying images assigned to one of said pigeonholes on at least one other viewing screen associated with a computer workstation connected to said first server via said local area network, and of assigning each of said images to its final recipient by "dropping" said image into one of the pigeonholes of another virtual sorting rack associated with said final recipient and displayed on said other viewing screen.

3. A method according to claim 1, further comprising a step of labeling each of the mailpieces, which step consists in associating the mailpiece as viewed on said viewing screen with a determined type of mail chosen from among the following types: express mail, tracked mail, and registered mail.

4. A method according to claim 3, further comprising a step of archiving said scanned images on a second server connected to said local area network via said external communications network.

5. A method according to claim 1, further comprising a step of remotely displaying a dynamic dialogue box on a remote consultation screen of a remote recipient connected to said local area network via an external communications network, said dynamic dialogue box including at least one counter whose value depends on the number of images that are assigned to the pigeonhole of said remote recipient and that are accessible on said first server from said remote consultation screen via both said external communications network and said local area network connecting said remote consultation screen to said first server.

6. A method according to claim 1, wherein, regardless of whether said consultation screen is local or remote, said images that are accessible on said first server via said consultation screen are backed up locally, destroyed, archived, or forwarded to another recipient, as selected by the recipient.

7. A system for enabling mailpieces to be distributed and consulted in electronic form, said system comprising:

scanning means for scanning each of the mailpieces and for transmitting the images of the mailpieces scanned in this way to a first server on which said images are stored;

a first viewing screen associated with said first server for the purposes of displaying said images stored on said first server, and of enabling, via a graphics interface, each of said images to be assigned to a recipient by "dropping" said image into one of the pigeonholes of a virtual sorting rack associated with said recipient and displayed on said first viewing screen or on a second viewing screen also associated with said first server; and at least one consultation screen of a final recipient for displaying a dynamic dialogue box including at least one counter whose value depends on the number of images that are assigned to the pigeonhole of said final recipient and that are accessible on said first server from said consultation screen via a local area network connecting said consultation screen to said first server.

8. A system according to claim 7, further comprising at least one other viewing screen associated with a computer workstation connected to said first server via said local area network for displaying said images assigned to one of said pigeonholes, and, via a graphics interface, for re-assigning each of said images to its final recipient by "dropping" said image into one of the pigeonholes of another virtual sorting rack associated with said final recipient and displayed on said other viewing screen.

9. A system according to claim 7, further comprising a remote consultation screen of a remote recipient connected to said local area network via an external communications network for displaying a dynamic dialogue box including at least one counter whose value depends on the number of images that are assigned to the pigeonhole of said remote recipient and that are accessible on said first server from said remote consultation screen via both said external communications network and said local area network connecting said remote consultation screen to said first server.

10. A system according to claim 9, wherein said external communications network is the Internet, and the link between said at least one remote consultation screen and said first server is a secure link.

11. A system according to claim 9, further comprising a second server connected to said local area network via said external communications network for the purpose of archiving said scanned images externally.

* * * * *